United States Patent
Ikeda

(10) Patent No.: US 7,664,293 B2
(45) Date of Patent: Feb. 16, 2010

(54) IMAGE SENSING APPARATUS AND CONTROL METHOD THEREOF

(75) Inventor: Takeshi Ikeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 554 days.

(21) Appl. No.: 11/226,340

(22) Filed: Sep. 15, 2005

(65) Prior Publication Data

US 2006/0062433 A1 Mar. 23, 2006

(30) Foreign Application Priority Data

Sep. 17, 2004 (JP) .............................. 2004-271009

(51) Int. Cl.
G06K 9/00 (2006.01)

(52) U.S. Cl. .................. 382/107; 382/112; 382/100; 382/254; 382/165; 382/163; 382/167; 382/275; 382/166; 382/276; 382/164

(58) Field of Classification Search ................ 382/107, 382/284, 100, 112, 162, 163, 164, 165, 260–265, 382/166, 167, 254, 255, 274–276; 396/52; 348/246; 358/1.18, 1.9, 518, 520, 540
See application file for complete search history.

(56) References Cited

U.S. PATENT DOCUMENTS

| 6,466,253 | B1* | 10/2002 | Honjoh ........................ 348/36 |
| 6,757,015 | B2* | 6/2004 | Inokuma et al. ............. 348/273 |
| 6,791,605 | B1* | 9/2004 | Reele et al. ............ 348/207.99 |
| 6,999,117 | B2* | 2/2006 | Yamazaki ................ 348/222.1 |
| 7,349,119 | B2* | 3/2008 | Tsukioka ................... 358/1.18 |
| 7,352,917 | B2* | 4/2008 | Kondo et al. ................. 382/291 |
| 7,468,743 | B2* | 12/2008 | Washisu ................... 348/208.1 |
| 7,545,958 | B2* | 6/2009 | Ohmura et al. ............. 382/112 |
| 2004/0170452 | A1* | 9/2004 | Hayashi et al. ............. 399/309 |
| 2004/0208475 | A1* | 10/2004 | Ohmura et al. ................ 386/4 |
| 2007/0258707 | A1* | 11/2007 | Raskar ........................ 396/52 |
| 2008/0025627 | A1* | 1/2008 | Freeman et al. ............. 382/255 |

FOREIGN PATENT DOCUMENTS

| JP | 5-7336 | 1/1993 |
| JP | 11-252427 | 9/1999 |
| JP | 11252427 | * 9/1999 |
| JP | 200-187478 | 7/2000 |
| JP | 2003-8967 | 1/2003 |

OTHER PUBLICATIONS

Japanese Action issued Mar. 14, 2008, in Japanese Application No. 2004-271009.

* cited by examiner

*Primary Examiner*—Wesley Tucker
*Assistant Examiner*—Nancy Bitar
(74) *Attorney, Agent, or Firm*—Fitzpatrick, Cella, Harper & Scinto

(57) ABSTRACT

An image sensing apparatus includes a selector, an image sensing unit, a memory unit, an image combining unit and a recording unit. The selector is used to select a main object. The image sensing unit senses a plurality of images including the main object. The memory unit stores the plurality of images. The image combining unit combines the plurality of images stored in the memory unit to generate a combined image in which the main object appears to be stopped and an object other than the main object appears to be flowing. The recording unit compresses the combined image and records the compressed combined image on a recording medium.

6 Claims, 12 Drawing Sheets

IMAGE SENSING APPARATUS AND CONTROL METHOD THEREOF

FIELD OF THE INVENTION

The present invention relates to an image sensing apparatus such as a digital camera.

BACKGROUND OF THE INVENTION

When an object of a photographing operation is moving at a high speed, a photographer has conventionally performed photographing using a high-speed shutter to obtain an image of the object without blurring, or performed photographing while panning the camera following the motion of the object. When the high-speed shutter is used, as the time to expose image sensing devices is reduced, the blurring of the object is reduced. However, in this case, all of the object is image-sensed without blurring, and therefore the obtained image lacks a realistic sensation that the object is moving. On the other hand, when photographing is performed with a camera panning to keep up with the motion of the object so as to obtain a realistic moving sensation, an image where the blurring of the object is reduced but the background is blurred (an image with follow shot effects) is obtained. However, the blurring of the object cannot be completely prevented due to the difference between the speed of motion of the object and the speed of the camera panning and camera shaking in a direction different from the direction of the motion of the object.

Further, upon night photographing to obtain an image where a car tail lamp or the like is flowing, the camera is fixed with a tripod stand or the like and exposure is performed over an extended time period, and an image where only a moving object appears to be flowing (an image with lasting effects) can be obtained. However, when the camera cannot be fixed since the tripod stand cannot be used, the entire image is blurred due to camera shaking.

As a method for correcting such blurring, an optical anti-shake system to perform image blur correction by detecting an acceleration, an angular acceleration, an angular velocity, an angular displacement and the like with a laser gyroscope and the like, appropriately performing calculation processing based on the results of detection, and driving a correcting optical device to decenter an photographing optical axis is known. Further, a method for performing image sensing plural times for exposure periods not to cause camera shaking and composition images obtained by the plural times of image sensing while correcting image shifts to obtain an image by long-hour exposure image sensing (composite image) is known (for example, Japanese Patent Application Laid-Open No. 5-7336).

Recently, downsizing of digital cameras is promoted in comparison with silver-chloride compact cameras. Especially, a camera having an SXGA-class image sensing device is so downsized that it can be included in a mobile electronic device (for example, a cellular phone).

When the above-described optical anti-shake system is incorporated in such a camera, further downsizing of the blur correcting optical device is required or downsizing of the shake detection unit, such as a laser gyroscope, is required.

However, downsizing of the blur correcting optical device is limited since it supports a correction lens and drives the lens with high accuracy. Further, as most of currently used shake detection units utilize an inertia force, when such shake detection unit is downsized, its detection sensitivity is lowered, and blur correction with high accuracy cannot be performed.

Further, as blurring applied to a camera, angular blurring about a predetermined axis and shift blurring by parallel shaking of the camera are detected. The angular blurring can be corrected by the optical anti-shake system. However, the shift blurring cannot be corrected without difficulty. Especially, as a camera is downsized, the shift blurring is increased.

On the other hand, in the anti-shake method as disclosed in the above Japanese Patent Application Laid-Open No. 5-7336, as a high-speed shutter not to cause blur in one image is employed, an image with follow shot effects or lasting effects as described above cannot be obtained by repeating image sensing and performing a composition of obtained images.

SUMMARY OF THE INVENTION

Accordingly, an object of the present invention is to overcome the above-described drawbacks. For example, one object of the present invention is to provide a small image sensing apparatus capable of providing an image with follow shot effects and/of lasting effects (i.e., visible indications that the object is moving).

According to an aspect of the present invention, an image sensing apparatus comprises detection means for detecting motion information of plural images; selection means for selecting an object; image moving means for performing position conversion on the plural images in a plain coordinates based on the motion information detected by the detection means; and interpolation means for performing interpolation between the plural images based on the motion information detected by the detection means, wherein the apparatus performs image composition so as to bring the object image selected by the selection means into correspondence by the image moving means and to perform interpolation between the plural images regarding an object other than the object selected by the selection means by the interpolation means.

According to another aspect of the present invention, an image sensing apparatus comprises detection means for detecting motion information of plural images; selection means for selecting an object; image moving means for performing position conversion on the plural images in a plain coordinates based on the motion information detected by the detection means; and interpolation means for performing interpolation between the plural images based on the motion information detected by the detection means, wherein the apparatus performs image composition so as to bring an object other than the object image selected by the selection means into correspondence by the image moving means and to perform interpolation between the plural images regarding the object selected by the selection means by the interpolation means.

According to another aspect of the present invention, an image sensing apparatus comprises detection means for detecting motion information of plural images; selection means for selecting an object; image moving means for performing position conversion on the plural images in a plain coordinates based on the motion information detected by the detection means; interpolation means for performing interpolation between the plural images based on the motion information detected by the detection means; and selection means for selecting one of a first mode to perform image composition so as to bring the object image selected by the selection means into correspondence by the image moving means and to perform interpolation between the plural images regarding an object other than the object selected by the selection means by the interpolation means, and a second mode to perform image composition so as to bring an object other than the object image selected by the selection means into correspondence by the image moving means, and to perform interpolation between the plural images regarding the object selected by the selection means by the interpolation means.

According to another aspect of the present invention, a control method for an image sensing apparatus have detection means for detecting motion information of plural images; selection means for selecting an object; image moving means for performing position conversion on the plural images in a plain coordinates based on the motion information detected by the detection means; and interpolation means for performing interpolation between the plural images based on the motion information detected by the detection means, for performing image composition so as to bring the object image selected by the selection means into correspondence by the image moving means and to perform interpolation between the plural images regarding an object other than the object selected by the selection means by the interpolation means.

According to another aspect of the present invention, a control method for an image sensing apparatus have detection means for detecting motion information of plural images; selection means for selecting an object; image moving means for performing position conversion on the plural images in a plain coordinates based on the motion information detected by the detection means; and interpolation means for performing interpolation between the plural images based on the motion information detected by the detection means, for performing image composition so as to bring an object other than the object image selected by the selection means into correspondence by the image moving means and to perform interpolation between the plural images regarding the object selected by the selection means by the interpolation means.

According to another aspect of the present invention, a control method for an image sensing apparatus comprises detection means for detecting motion information of plural images; selection means for selecting an object; image moving means for performing position conversion on the plural images in a plain coordinates based on the motion information detected by the detection means; and interpolation means for performing interpolation between the plural images based on the motion information detected by the detection means, the method comprises a selection step of selecting one of a first mode to perform image composition so as to bring the object image selected by the selection means into correspondence by the image moving means and to perform interpolation between the plural images regarding an object other than the object selected by the selection means by the interpolation means, and a second mode to perform image composition so as to bring an object image other than the object selected by the selection means into correspondence by the image moving means, and to perform interpolation between the plural images regarding the object selected by the selection means by the interpolation means.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

Note that the following embodiments merely show examples of implementation of the present invention and may be appropriately corrected or changed in accordance with the construction of the apparatus to which the present invention is applied or various conditions. The present invention is not limited to the following embodiments.

Further, the object of the present invention can also be achieved by providing a storage medium (or recording medium) holding software program code for performing the functions of the image sensing apparatus to be described later to a system or an apparatus, reading the program code from the storage medium then executing the program by a computer (e.g., CPU, MPU) of the system or apparatus.

First Embodiment

Figure 1:
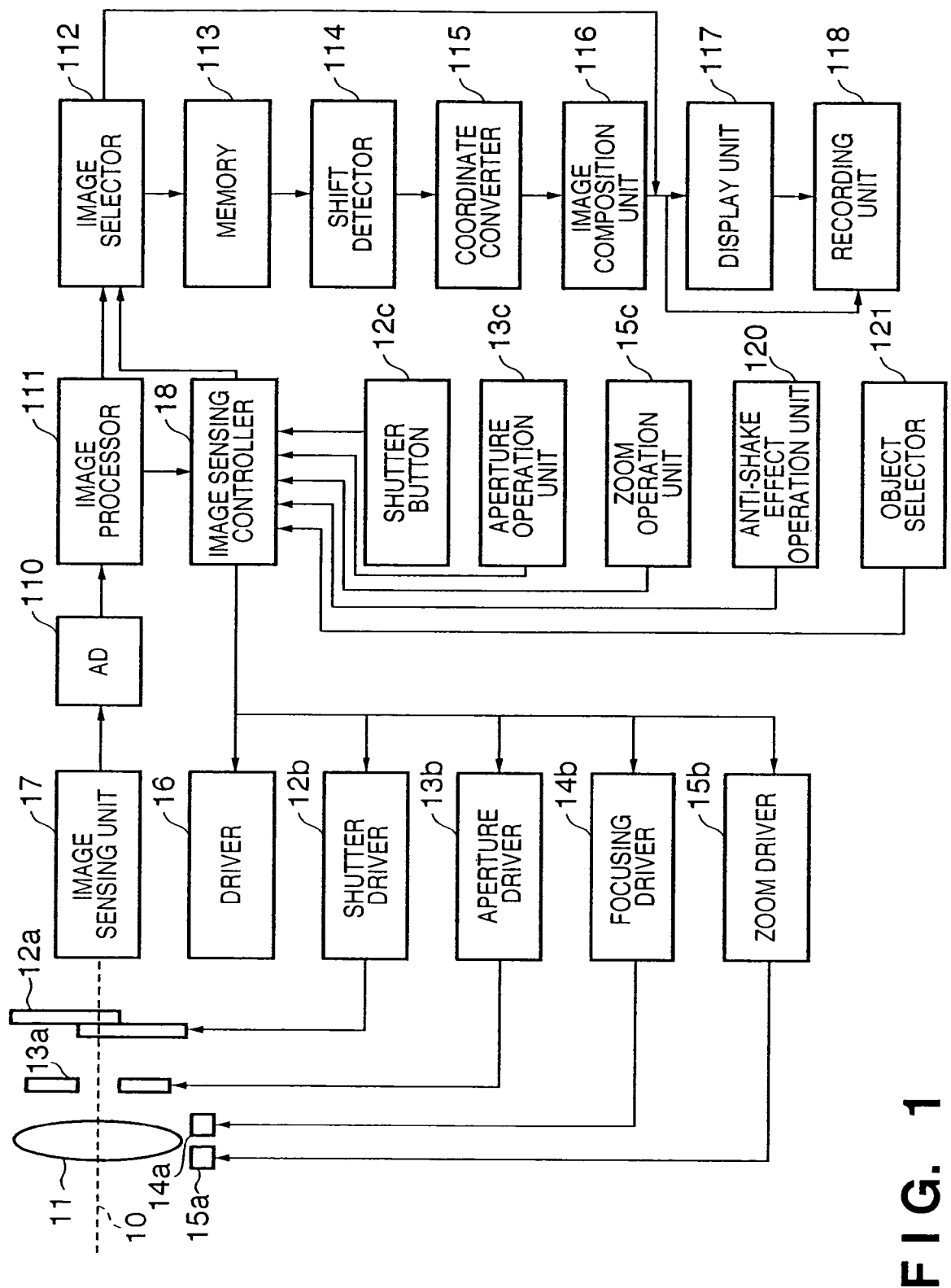
FIG. 1 is a block diagram showing an example of the construction of an image sensing apparatus according to a first embodiment of the present invention.

FIG. 1 is a block diagram showing the construction of a digital camera as an example of an image sensing apparatus according to a first embodiment of the present invention. Note that the image sensing apparatus according to the first embodiment can be realized as a digital video camera, a cellular phone having a camera, a computer having a camera and the like, as well as a digital camera.

A light beam (image sensing light) incident from an image sensing lens 11 is light-amount controlled by an aperture 13a, then passed through a shutter 12a, and forms an image in an image sensing unit 17. The image sensing unit 17 converts the received light into an image signal using an image sensing device such as a CMOS image sensor or a CCD image sensor.

The photographing lens 11 has plural optical lens groups. A part or all of these lens groups move on an optical axis 10 by a driving force from an AF driving motor 14a, and stop in a predetermined focusing position, thereby performing focusing adjustment. The AF driving motor 14a is driven in accordance with a driving signal from a focusing driver 14b.

Further, a part of optical lens groups of the photographing lens 11 moves on the optical axis 10 by a driving force from a zoom driving motor 15a and stops in a predetermined zoom position, thereby changing a photographing view angle. The zoom driving motor 15a is driven in accordance with a driving signal from a zoom driver 15b.

The aperture 13a has plural aperture blades. These aperture blades operate by a driving force from an aperture driver 13b and change an opening area (aperture diameter) as a light passing opening. The shutter 12a has plural shutter blades. These shutter blades open/close the opening as the light passing opening by a driving force from a shutter driver 12b, thereby controlling the light beam to enter the image sensing unit 17.

The focusing driver 14b, the zoom driver 15b, the aperture driver 13b and the shutter driver 12b are controlled by an image sensing controller 18.

The image sensing controller 18 inputs operation signals from a shutter button 12c, an aperture operation unit 13c, a zoom operation unit 15c, an anti-shake effect operation unit 120 and an object selector 121. The image sensing unit 18 supplies the operation signals to the focusing driver 14b, the zoom driver 15b, the aperture driver 13b and the shutter driver 12b in accordance with the image sensing status of the digital camera, thereby setting image sensing conditions, and performs image sensing. Note that the shutter button 12c has a first release switch (SW1) which is turned ON when half-depressed and a second release switch (SW2) which is turned ON when full-depressed.

Note that the aperture operation unit 13c is not necessary since generally the opening diameter of the aperture 13a is automatically set on the digital camera side upon image sensing. However, the aperture operation unit 13c is provided for a photographer to arbitrarily set image sensing conditions.

The image sensing controller 18 performs measurement of brightness of an object (photometry) based on a digital image signal inputted in an image processor 111 to be described later, and determines the aperture diameter of the aperture 13a and closing timing of the shutter 12a (exposure time) based on the result of photometry. Further, the image sensing controller 18 obtains a focusing position of the photographing lens 11 based on an output from the image processor 111 while driving the focusing driver 14b.

An image signal outputted from the image sensing unit 17 is converted to a digital image signal by an A/D converter 110 and inputted into the image processor 111. The image processor 111 generates image data corresponding to an obtained image from the digital image signal from the A/D converter 110.

The image data generated by the image processor 111 is inputted via an image selector 112 into a display unit 117 and a recording unit 118. The display unit 117 displays the image data on a display device such as a liquid crystal display. The recording unit 118 compresses the image data and stores the data on a recording medium such as a memory card.

In the above-described operations, when follow shot effects without camera shaking is required, a photographer operates the anti-shake effect operation unit 120 to set the anti-shake system to a "follow shot" setting, to perform the following operations.

First, when the photographer half-depresses the shutter button 12c, an image sensing preparatory operations (a focusing adjustment operation, a photometry operation and the like) are started. The closing timing of the shutter 12a (exposure period) and the aperture diameter of the aperture 13a are set based on a photometry value obtained by the photometry operation. The exposure period is divided into plural short exposure periods, and image sensing is repeated by the number of divided exposure periods. When the exposure period is divided into plural short exposure periods, respective images are obtained in an underexposure state. However, the influence of camera shaking is reduced in these images.

Then after the image sensing, the composite image is made by the composition of the plural images, thereby improving exposure.

However, when plural images are obtained, even though there is no influence of camera shaking in the respective images obtained by multiple image sensing operations, the composition may be slightly shifted among the images due to camera shaking during the serial image sensing. When the composition of these images are performed, the composite image is blurred in correspondence with the shift of the composition among the respective images.

In the present embodiment, plural image signals outputted from the image sensing unit 17 in the serial image sensing operation are converted to digital image signals by the A/D converter 110 and subjected to predetermined image processing by the image processor 111.

On the other hand, when the anti-shake effect operation unit 120 is operated to instruct the image sensing controller 18 to set the anti-shake system to the "follow shot" setting, a display position of a main object on a screen is previously selected using the object selector 121. As long as the object selector has a cross key, a selection button and an enter key, the display position can be freely selected on the screen. In this example, a central portion on the image screen has been previously selected by the object selector 121. Further, the object selection by the object selector 121 may be performed by selecting a main object from at least one of the plural images after image sensing.

Figure 2:
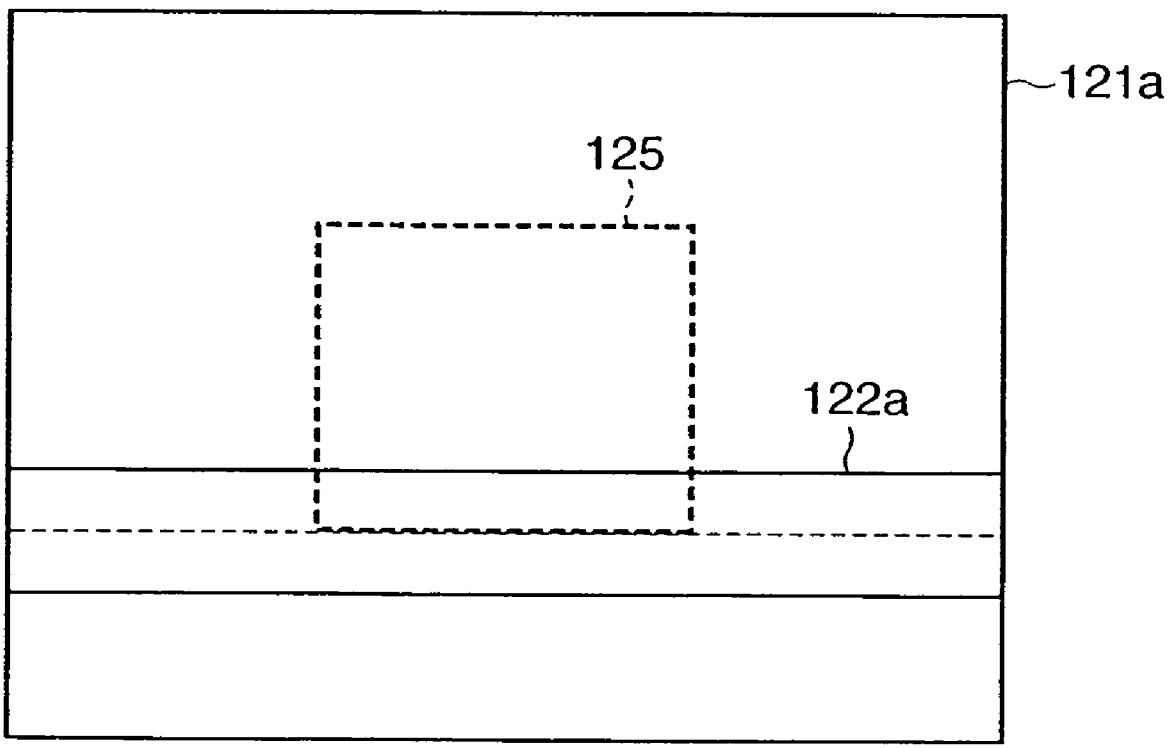
FIG. 2 is an explanatory view of a selection of an object according to the first embodiment of the present invention.

For example, as shown in FIG. 2, when a vehicle running on a road 122a at the central portion of a frame 121a is to be photographed and photographing is to be performed while the digital camera is panned, a frame 125 is drawn by the object selector 121, thereby designating the selection range.

Then image data from the image processor 111 is inputted into the memory 113 via the image selector 112.

The memory 113 holds plural images obtained by serial image sensing.

A shift detector 114 extracts a screen feature point in an image stored in the memory 113 within a frame selected by the object selector 121, and obtains position coordinates of the feature point in the image sensing screen.

Figure 3A:
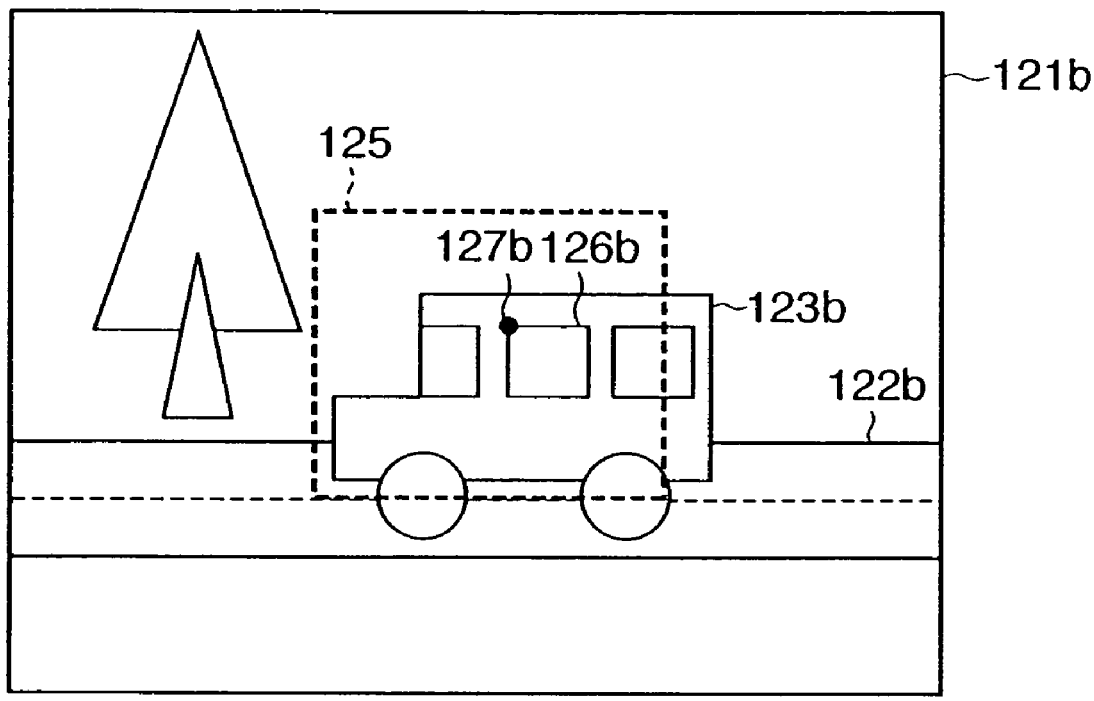
FIGS. 3A and 3B are explanatory views showing position coordinates of the selected object according to the first embodiment of the present invention.
Figure 3B:
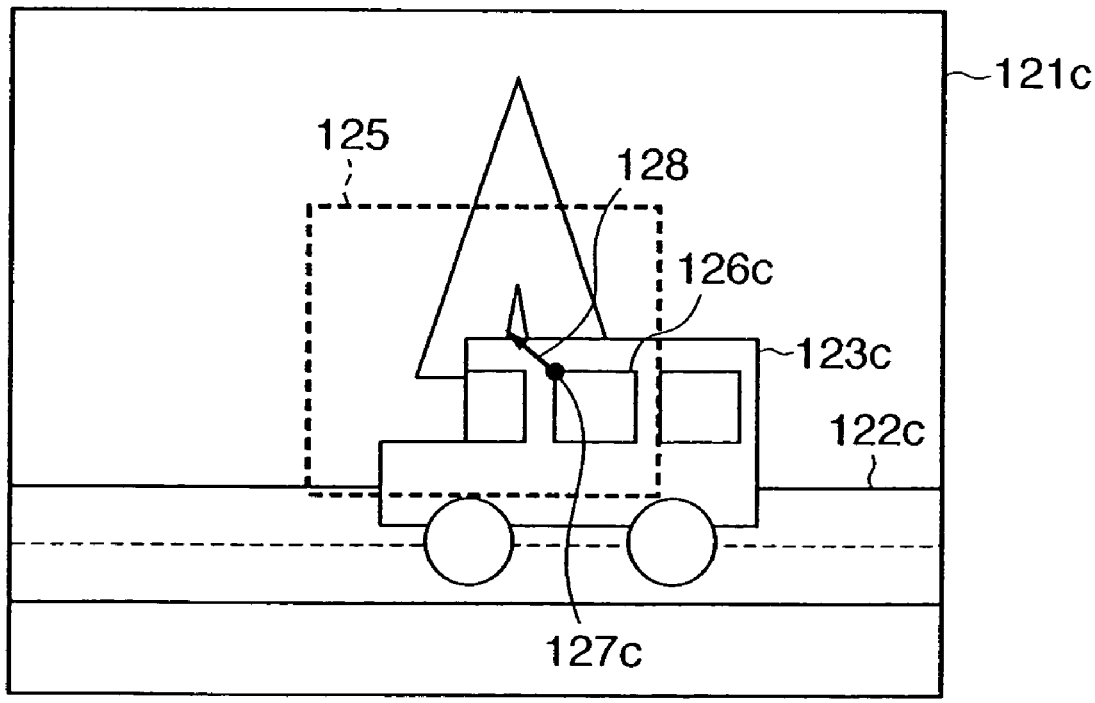

For example, in FIGS. 3A and 3B where a vehicle 123b runs on a road 122b in a frame 121b, the photographer tries to perform photographing in the same direction as the traveling direction of the vehicle 123b and at the same speed as that of the vehicle 123b. However, the speed of panning of the digital camera may be different from the speed of the vehicle 123b, or the camera may be shaken in a direction different from the traveling direction of the vehicle 123b. As a result of multiple image sensing operations, in the case of the frame 121c, the composition of the image may be shifted from that of the frame 121b.

The shift detector 114 extracts a high-luminance point, an edge 127b of a window 126b in the vehicle 123b positioned within a frame 125 selected by the object selector 121, as a feature point, by edge detection, then compares the feature point 127b with a feature point 127c in the frame 121c, and corrects the difference (coordinate conversion).

In FIGS. 3A and 3B, the frame 121c is subjected to coordinate conversion by moving the feature point 127b of the frame 121b onto the feature point 127c of the frame 121c as indicated with an arrow 128.

In this example, the change of feature point is obtained between the first image frame 121b and the second image frame 121c in the plural images obtained by serial image sensing. Further, the change of feature point is similarly obtained regarding the subsequent images.

Note that it may be arranged such that plural points are selected as feature points and a mean value of motion vectors or a minimum scalar value of these points is obtained as the change of feature points.

Figure 4:
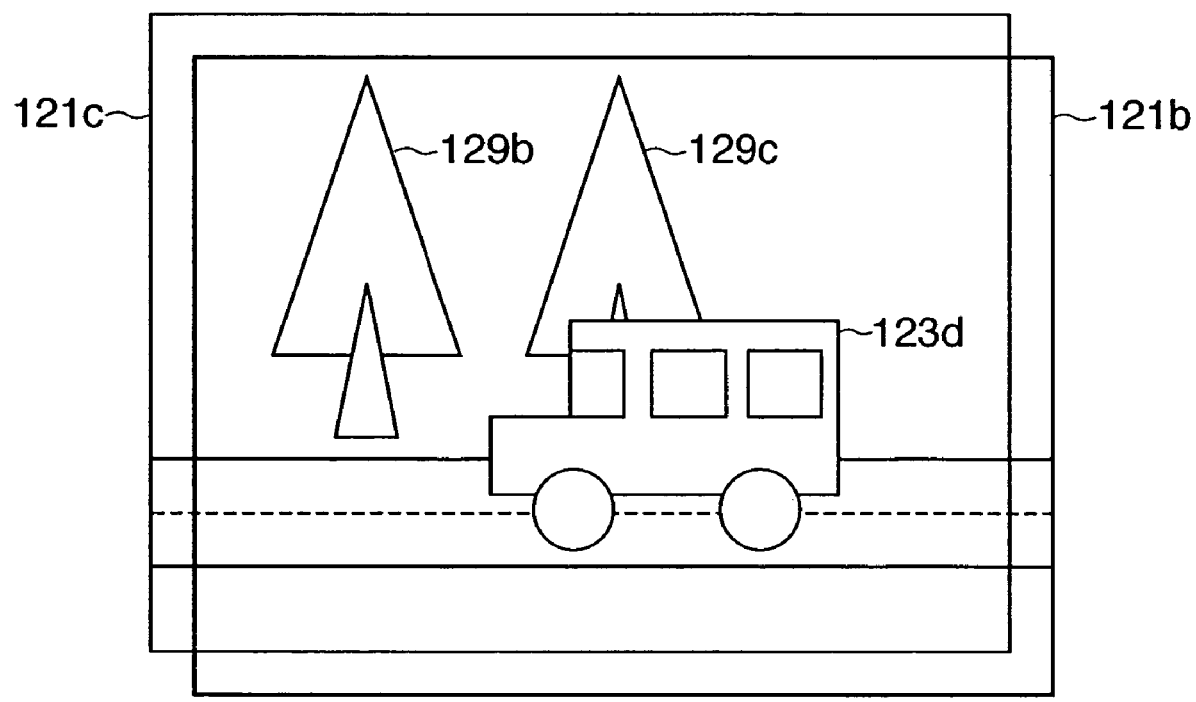
FIG. 4 illustrates a composite image after coordinate conversion according to the first embodiment of the present invention.

The respective images subjected to the coordinate conversion by the coordinate converter 115 are outputted to an image composition unit 116, and the composite image is made by the composition of these images as shown in FIG. 4.

As described above, the main object, the coordinates of which in the respective images are brought into correspondence by the coordinate conversion, appears as the vehicle 123d in the composite image in FIG. 4. On the other hand, as the digital camera has been panned and the image sensing has been performed at a shutter speed to reduce influence of camera shaking, a tree in the background as an object other than the main object, the coordinates of which in the respective images do not correspond with each other, discretely appears as separate trees 129b and 129c in the composite image. Next, composition of the discretely composite objects, i.e., the trees 129b and 129c such that the tree is flowing, will be described with reference to FIG. 5.

Figure 5:
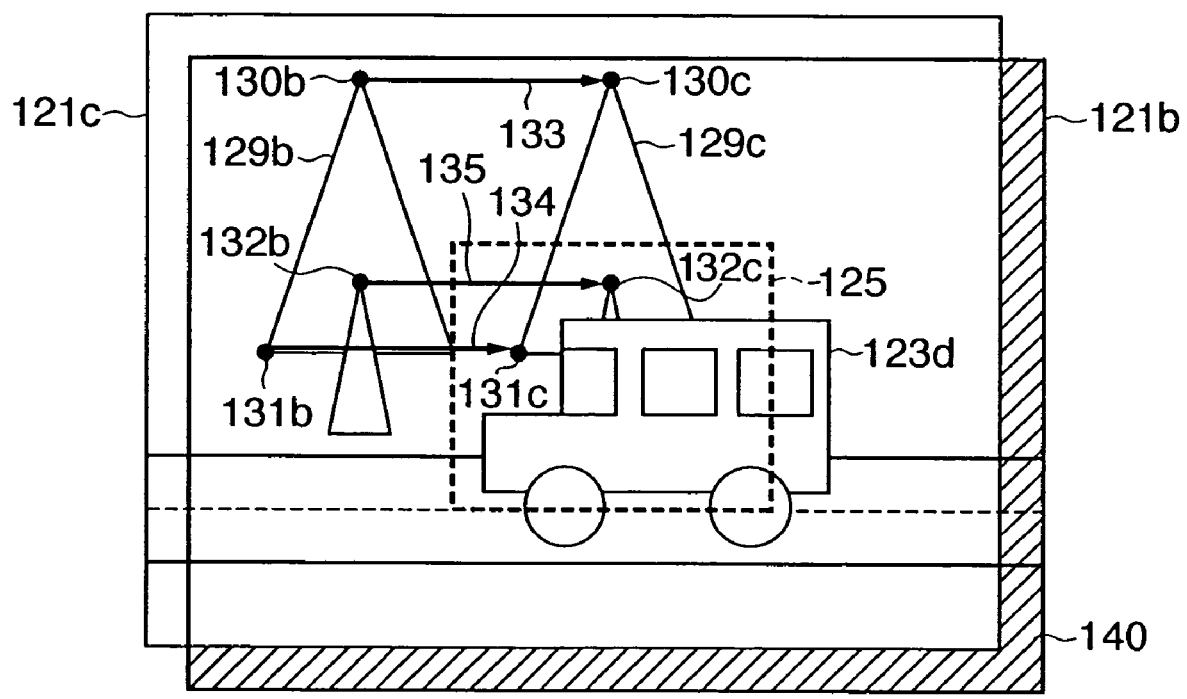
FIG. 5 is an explanatory view of image interpolation on an object other than the main object according to the first embodiment of the present invention.
Figure 6:
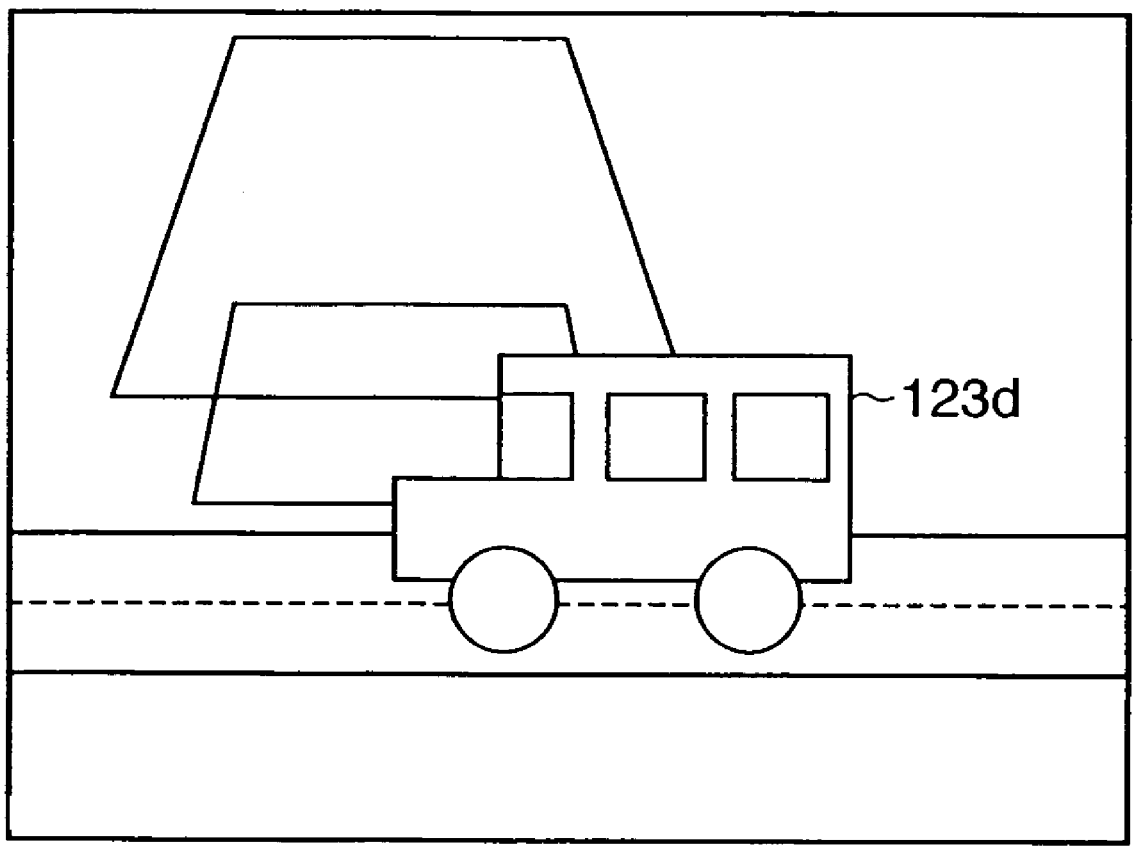
FIG. 6 is a final composite image according the first embodiment of the present invention.

In FIG. 5, feature points outside the object selection frame 125 in the frame 121b are extracted. Among the objects outside the object selection frame 125, edges 130b, 131b and 132b of the tree 129b, having generally high luminance, color hue, chromaticity and brightness, are extracted as feature points by edge detection and stored. Then the object in the background, the tree 129b is extracted based on the luminance, color hue, chromaticity and brightness levels obtained by the edge detection. Then, points having the same feature levels as those of the previously stored points are extracted from the whole screen of the frame 121c (130c, 131c and 132c). The edge loci are obtained by connecting the edges between the respective frames with straight lines, and the amount and the direction of movement of the tree 129b are predicted. The locus between the edges 130b and 130c is indicated as an arrow 133; that between the edges 131b and 131c is indicated as an arrow 134; and that between the edges 135b and 135c is indicated as an arrow 135. Then image interpolation is performed along the loci with the same luminance, color hue, chromaticity and brightness, thereby performing image drawing such that the tree 129b flows to the tree 129c as shown in FIG. 6. Note that when the tree 129b is drawn to the tree 129c, the vehicle 123d as the main object is not interpolated, thereby preventing it from being covered with the background. The range of the vehicle 123b as the main object can be determined since plural edges as the same edges have not been detected by the edge detection in the vehicle 123b (the object in the respective frames already correspond with each other).

The composite image data made by the image composition unit 116 is inputted via the image selector 112 to the display unit 117 and the recording unit 118. The display unit 117 displays the image data on the display device such as a liquid crystal display. The recording unit 118 compresses the image data and stores the data onto a recording medium such as a memory card.

Figure 7:
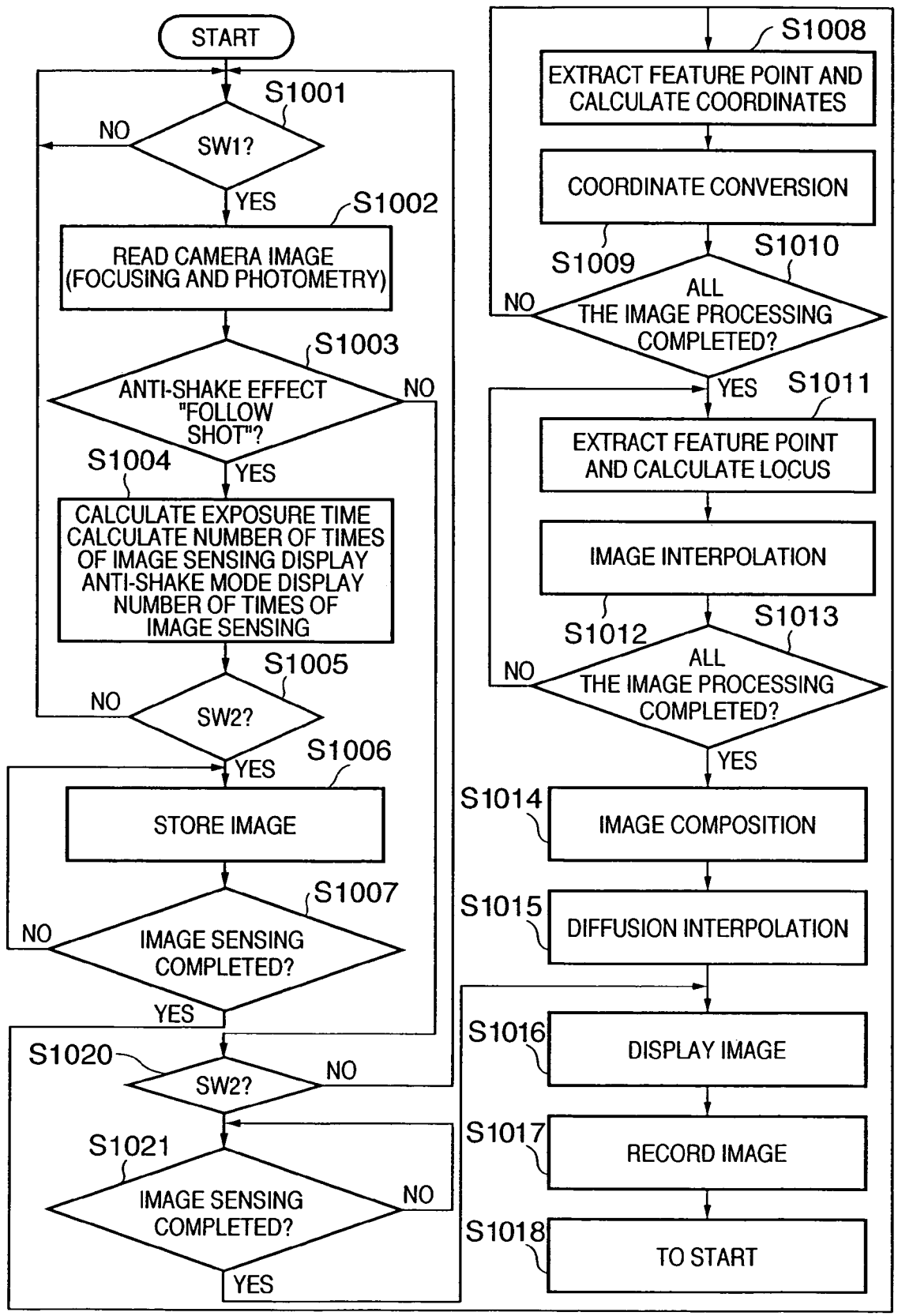
FIG. 7 is a flowchart showing image sensing processing according to the first embodiment of the present invention.
Figure 8:
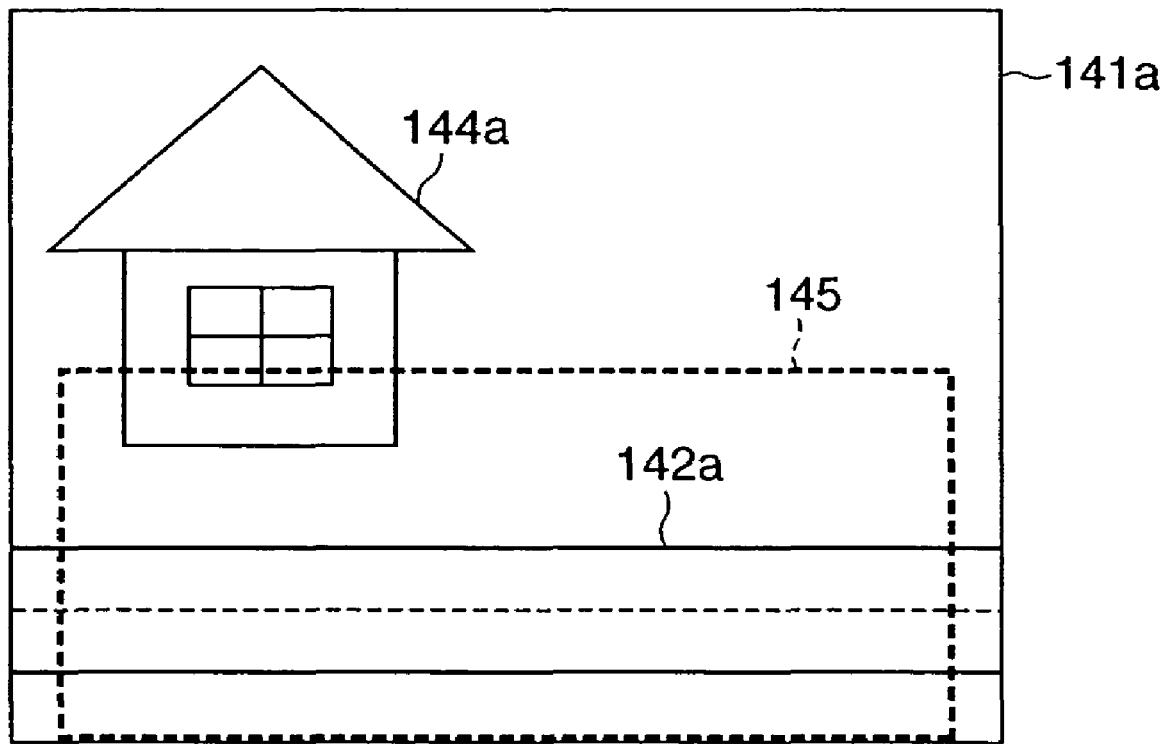
FIG. 8 is an explanatory view of the selection of an object according to a second embodiment of the present invention of the present invention.

FIG. 7 is a flowchart showing image sensing processing in the digital camera according to the first embodiment. The flow starts when the power of the digital camera is turned ON.

At step S1001, the camera is in a standby status until the shutter button 12c is half-depressed. When the first release switch (SW1) is turned ON, the process proceeds to step S1002.

At step S1002, image sensing is performed by the image sensing unit 17. The image sensing controller 18 drives the AF driving motor 14a to move the photographing lens 11 in an optical axis direction while detecting an image contrast based on an output from the image processor 111.

When a highest contrast is obtained, the driving of the photographing lens 11 is stopped, thereby the image sensing optical system is set to a focusing state (AF by the hill climbing method). Note that the focusing adjustment may be performed by phase difference detection.

Further, at this time, the image sensing controller 18 obtains the brightness of an object based on the output from the image sensing unit 17.

At step S1003, it is determined whether or not the photographer has set the anti-shake effect operation unit 120 to the "follow shot" setting. When the anti-shake effect operation unit 120 is in the "follow shot" setting, the process proceeds to step S1004, otherwise, the process proceeds to step S1018.

Next, the flow of the case where the anti-shake effect operation unit 120 is set to the "follow shot" setting will be described.

At step S1004, the number of times of image sensing and exposure periods of the respective times of image sensing are obtained based on the image sensing conditions such as the brightness of the object obtained at step S1002.

The image sensing conditions include:
1. brightness of object;
2. focal length of image sensing optical system
3. brightness of image sensing optical system (aperture value); and
4. sensitivity of image sensing device.

For example, assuming that the sensitivity of the image sensing unit 17 is ISO 100, to measure the brightness of an object (photometry) and perform appropriate exposure based on the result of photometry, the aperture 13a is full-opened (e.g., f4.0) and the closing timing of the shutter 12a, i.e., the exposure period, is set to 1/50 sec.

When the focal length of the image sensing optical system is equivalent to 100 mm of 35 mm film, image sensing with an exposure period of 1/50 sec may cause image blurring due to camera shaking. To prevent camera shaking from affecting the image, the exposure period is set to 1/100 sec and image sensing is performed twice.

On the other hand, when the focal length of the image sensing optical system is 400 mm, the exposure period is set to 1/500 sec and image sensing is performed 10 times so as to prevent camera shaking from affecting the image.

In this manner, the exposure period upon multiple image sensing operations is determined in correspondence with image sensing conditions, and the number times of image sensing is performed is set in correspondence with the image sensing conditions.

In a case where the same object is image-sensed plural times, it is preferable that exposure conditions of respective times of image sensing are close to an appropriate exposure as much as possible so as to perform image sensing with accurate information by the image sensing unit 17.

For this purpose, when an object is dark or the aperture of the photographing lens is narrowed and the brightness of the lens is low, or when the sensitivity of the image sensing unit 17 is low, the exposure periods of respective times of image sensing are lengthened as much as possible even in plural times of image sensing, to obtain effective exposure conditions.

Note that if exposure periods are too long, the influence of camera shaking appears in an image surface. Accordingly, as described above, when the focal length of the image sensing optical system is equivalent to 100 mm of 35 mm film, the exposure period is set to $\frac{1}{100}$ sec corresponding to about $\frac{1}{100}$ mm (focal length).

Further, the number of times of image sensing is set so as to compensate for the underexposure.

When the focal length is long, the exposure period is further shortened so as to prevent image degradation due to camera shaking, and the number of times of image sensing is increased to compensate for the underexposure.

In this manner, when multiple image sensing operations are performed, as the object or the photographing lens is dark, the exposure period is long. As the sensitivity of the image sensing unit 17 is low, the exposure period is long. Further, as the focal length of the lens is long, the exposure period is short.

The number of times of image sensing of serial image sensing is increased as the object becomes darker or aperture of the photographing lens is narrowed. As the sensitivity of the image sensing device decreases, the number of times of image sensing is increased, and further, as the focal length of the lens is lengthened, the number of times of image sensing is increased.

After the completion of the above calculation, the setting of anti-shake mode (plural image sensing mode) is displayed on the display unit 117, and at the same time, the number of times of image sensing is displayed on the display unit 117 for the photographer.

At step S1005, it is determined whether or not the shutter button 12c has been full-depressed. When the shutter button 12c has been full-depressed, the second release switch (SW2) is turned ON.

At step S1006, the obtained images are temporarily stored into the memory 113.

Step S1006 is repeated until it is determined at step S1007 that all the image sensing has been completed.

When all the image sensing has been completed, the process proceeds to step S1008.

At step S1008, the shift detector 114 extracts a characteristic image (feature point) from an image (e.g., the vehicle 123b in FIGS. 3A and 3B) in the object selection frame (e.g., the frame 125 in FIGS. 3A and 3B) previously set by the object selector 121, and obtains the coordinates of the image.

At step S1009, the coordinate converter 115 performs coordinate conversion of respective images. Note that coordinate conversion is not performed only on the first frame image (first image). That is, the first image is used as a reference image upon coordinate conversion.

The feature point extraction at step S1008 and the coordinate conversion at step S1009 are performed on all the second and subsequent images, and when it is determined at step S1010 that the coordinate conversion of all the images has been completed, the process proceeds to step S1011.

At step S1011, the shift detector 114 extracts a characteristic image (feature point) from an image (e.g., the tree 129b in FIG. 5) outside the object selection frame (e.g., the frame 125 in FIG. 5) previously set by the object selector 121, and obtains the coordinates of the image. At this time, the luminance, color hue, chromaticity and brightness of the extracted point are stored. Points having the same features are extracted as a group, thereby extracting the image of the tree 129b. The shift detector 114 extracts points having the same features as those of the stored points from the second image group (the frame 121c in FIG. 5), and obtains the loci of the image of the tree 129b.

At step S1012, image interpolation is performed using the luminance, color hue, chromaticity and brightness of the respective points along the loci calculated at step S1011, thereby generating an image where the tree 129b flows to the tree 129c in FIG. 5.

The feature point extraction at step S1011 and the image interpolation at step S1012 are repeated until all the second and subsequent images have been processed. When it is determined at step S1013 that the coordinate conversion of all the images has been completed, the process proceeds to step S1014.

At step S1014, the composition of the first image and the respective image of the coordinate-converted second image group are performed.

The image composition is performed by averaging corresponding coordinate values of the respective images, and random noise in the image can be reduced by the averaging. Then, the image with reduced noise is subjected to gain control to increase the level of gain, to optimize the exposure.

At step S1015, in the composite image, an area where the respective images are not overlaid due to composition shift (an area 140 in FIG. 5) is cut, and the image is subjected to diffusion-interpolation to obtain the initial frame size.

At step S1016, the image data generated by the image processor 111 or the composite image data made by the image composition unit 116 is displayed on the display unit 117.

At step S1017, the image data generated by the image processor 111 or the composite image data made by the image composition unit 116 is stored on a recording medium such as a memory card.

At step S1018, the process returns to START.

Note that in a case where the shutter button 12c is still half-depressed and the switch SW1 is ON at step S1018, the process proceeds to steps S1001 to S1004 again.

Further, in a case where the shutter button 12c has been full-depressed and the switch SW2 is ON at step S1018, the process does not return to START but stands by at step S1017.

Next, the flow of the case where the anti-shake effect operation unit 120 is OFF at step S1003 will be described.

At step S1003, if it is determined that the anti-shake effect operation unit 120 is OFF, the process proceeds to step S1020.

At step S1020, the process proceeds from step S1001 to step S1020 until the shutter button 12c is full-depressed and the switch SW2 is turned ON.

At step S1021, the process stands by until normal image sensing (normal image sensing mode under exposure conditions effective in one exposure) has been completed. Upon completion of exposure, the process proceeds to step S1016.

At step S1016, the image data generated by the image processor 111 or the composite image data made by the image composition unit 116 is displayed on the display unit 117.

At step S1017, the image data generated by the image processor 111 or the composite image data made by the image composition unit 116 is stored on a recording medium such as a memory card.

At step S1018, the process returns to START.

According to the first embodiment, an image with follow shot effects and without blur due to camera shaking can be obtained by performing image sensing plural times for exposure periods not to cause image blurring while panning a camera, then performing image composition so as to eliminate shifts of a main object while correcting the locus of motion of object(s) other than the main object in images obtained by the multiple image sensing operations.

Second Embodiment

In the first embodiment, a feature point of an object within an object selection frame set by the object selector 121 is extracted by the shift detector 114 and image composition is performed, and interpolation processing is performed on object(s) outside the frame such that it flows (i.e., "follow shot" effects photographing to obtain an image where a main object is stopped and the background is flowing).

In the second embodiment, feature points of object(s) outside the object selection frame set by the object selector 121 are extracted by the shift detector 114 and image composition is performed, and interpolation processing is performed on an object within the frame such that it flows (i.e., "lasting" effects photographing to obtain an image where a main object is flowing and the background is stopped).

As the digital camera according to the second embodiment has the same structure as that according to the first embodiment. In the present embodiment, a method for obtaining the "lasting" effects different from the "follow shot" effects in the first embodiment will be described.

In the image sensing apparatus having the same units as those of the first embodiment, to obtain the lasting effects without camera shaking, the photographer sets the anti-shake effect operation unit 120 to set the anti-shake system to the "lasting" setting, to perform the following operations.

First, when the photographer half-depresses the shutter button 12c, image sensing preparatory operations (a focusing adjustment operation, a photometry operation and the like) are started. The closing timing of the shutter 12a (exposure period) and the aperture diameter of the aperture 13a are set based on a photometry value obtained by the photometry operation. The exposure period is divided into plural short exposure periods, and image sensing is repeated by the number of divided exposure periods. When the exposure period is divided into plural short exposure periods, respective images are obtained in an underexposure state. However, the influence of camera shaking is reduced in these images.

Then after the image sensing, the composite image is made by the composition of the plural images, thereby improving exposure.

However, when plural images are obtained, even though there is no influence of camera shaking in the respective images obtained by multiple image sensing operations, the composition may be slightly shifted among the images due to camera shaking during the serial image sensing. When the composition of these images is performed, the composite image is blurred in correspondence with the shift of the composition among the respective images.

In the present embodiment, plural image signals outputted from the image sensing unit 17 in the serial image sensing are converted to digital image signals by the A/D converter 110 and subjected to predetermined image processing by the image processor 111.

On the other hand, when the anti-shake effect operation unit 120 is operated to instruct the image sensing controller 18 to set the anti-shake system to the "lasting" setting, a display position of a main object on a screen is previously selected using the object selector 121. As long as the object selector has a cross key, a selection button and an enter key, the display position can be freely selected on the screen. In this example, a central portion on the image screen has been previously selected by the object selector 121. Further, the object selection by the object selector 121 may be performed by selecting a main object from at least one of the plural images after image sensing.

For example, when a vehicle running on a road 142a in a lower half portion of the screen in a frame 141a is to be taken by fixed-point photographing to obtain lasting effects, a frame 145 is drawn by the object selector 121, thereby designating the selection range.

Then image data from the image processor 111 is inputted into the memory 113 via the image selector 112.

The memory 113 holds plural images obtained by serial image sensing.

The shift detector 114 extracts a screen feature point in an image stored in the memory 113 within a frame selected by the object selector 121, and obtains position coordinates of the feature point in the image sensing screen.

Figure 9A:
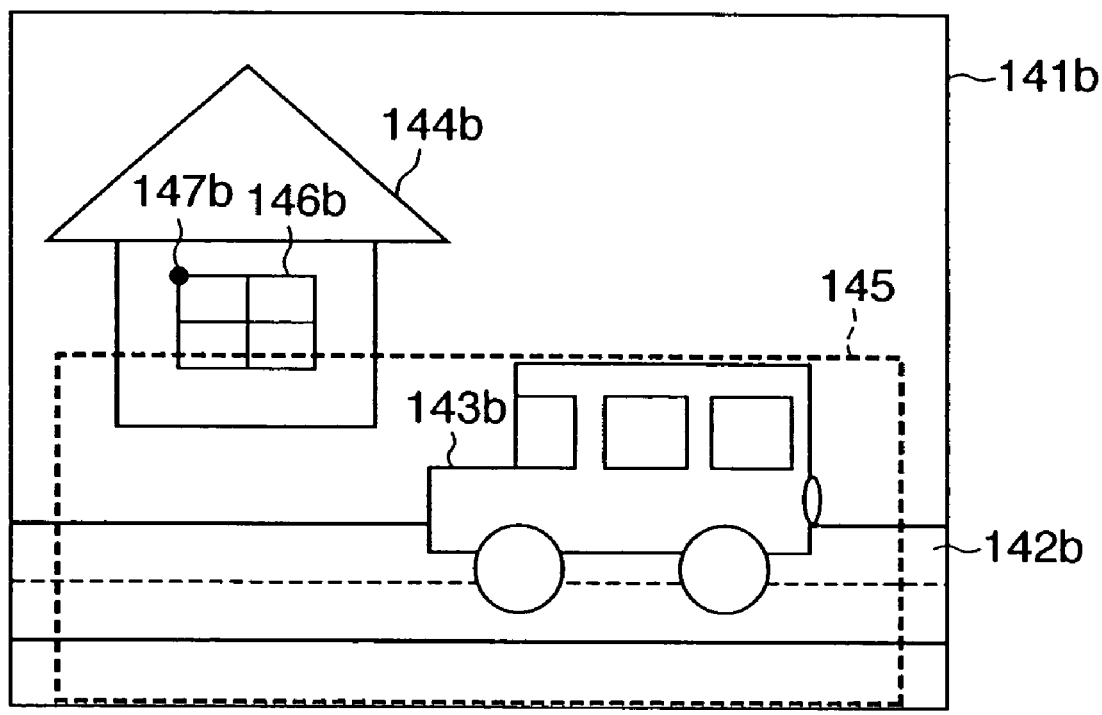
FIGS. 9A and 9B are explanatory views showing position coordinates of the selected object according to the second embodiment of the present invention.
Figure 9B:
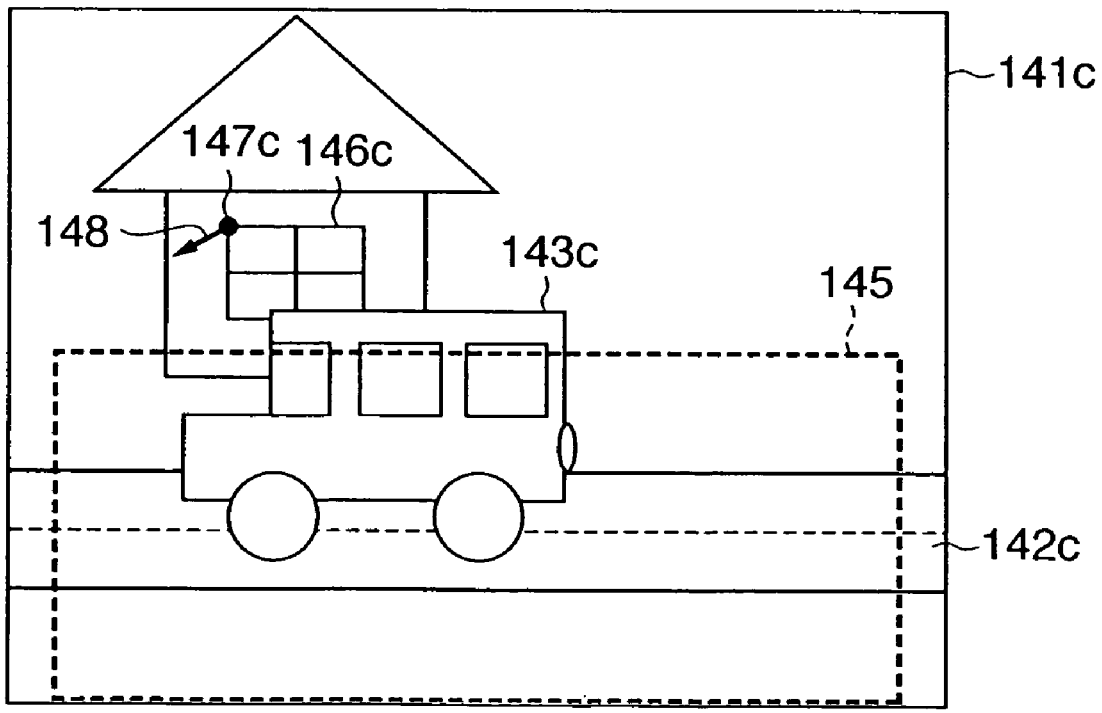

For example, when the photographer performs fixed-point photographing to take a scene where a vehicle 143b runs on a road 142b in a frame 141b as shown in FIGS. 9A and 9B, in an environment where the digital camera cannot be fixed with a tripod stand or the like, the photographer tries to perform image sensing without shaking the digital camera. However, the plural times of image sensing in a hand-hold state may produce an image as in the case of the frame 141c where the composition of the image is shifted from that of the frame 141b.

The shift detector 114 extracts a high-luminance point, an edge 147b of a window 146b in a house 144b positioned outside the frame 145 selected by the object selector 121, as a feature point, by edge detection, then compares the feature point 147b with a feature point 147c in the frame 141c, and corrects the difference (coordinate conversion).

In FIGS. 9A and 9B, the frame 141c is subjected to the coordinate conversion by moving the feature point 147b of the frame 141b onto the feature point 147c of the frame 141c as indicated with an arrow 148.

In this example, the change of feature point is obtained between the first image frame 141b and the second image frame 141c in the plural images obtained by serial image sensing. Further, the change of feature point is similarly obtained regarding the subsequent images.

Note that it may be arranged such that plural points are selected as feature points and a mean value of motion vectors or a minimum scalar value of these points is obtained as the change of feature points.

Figure 10:
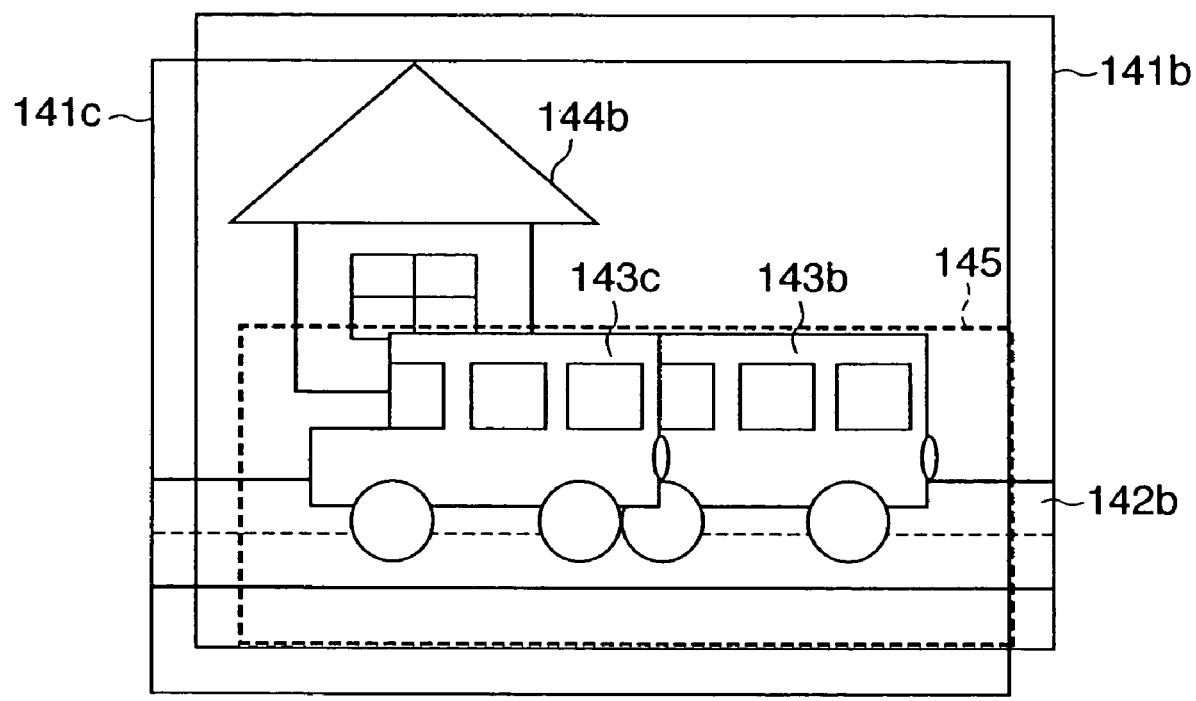
FIG. 10 is a composite image after the coordinate conversion according to the second embodiment of the present invention.

The respective images subjected to the coordinate conversion by the coordinate converter 115 are outputted to the image composition unit 116, and the composite image is made by the composition of these images as shown in FIG. 10.

As described above, as the object which is not a main object, the coordinates of which in the respective images are brought into correspondence by the coordinate conversion, appears as the house 144 in the composite image. On the other hand, as the image sensing has been performed at a shutter speed to reduce influence of camera shaking and the object in motion (vehicle) is on the image screen, the vehicle as the main object, the coordinates of which in the respective images do not correspond with each other, discretely appears as separate vehicles 143b and 143c in the composite image. Next, composition of the discretely composite objects, i.e., the vehicles 143b and 143c such that the vehicle moves, will be described with reference to FIG. 11.

Figure 12:
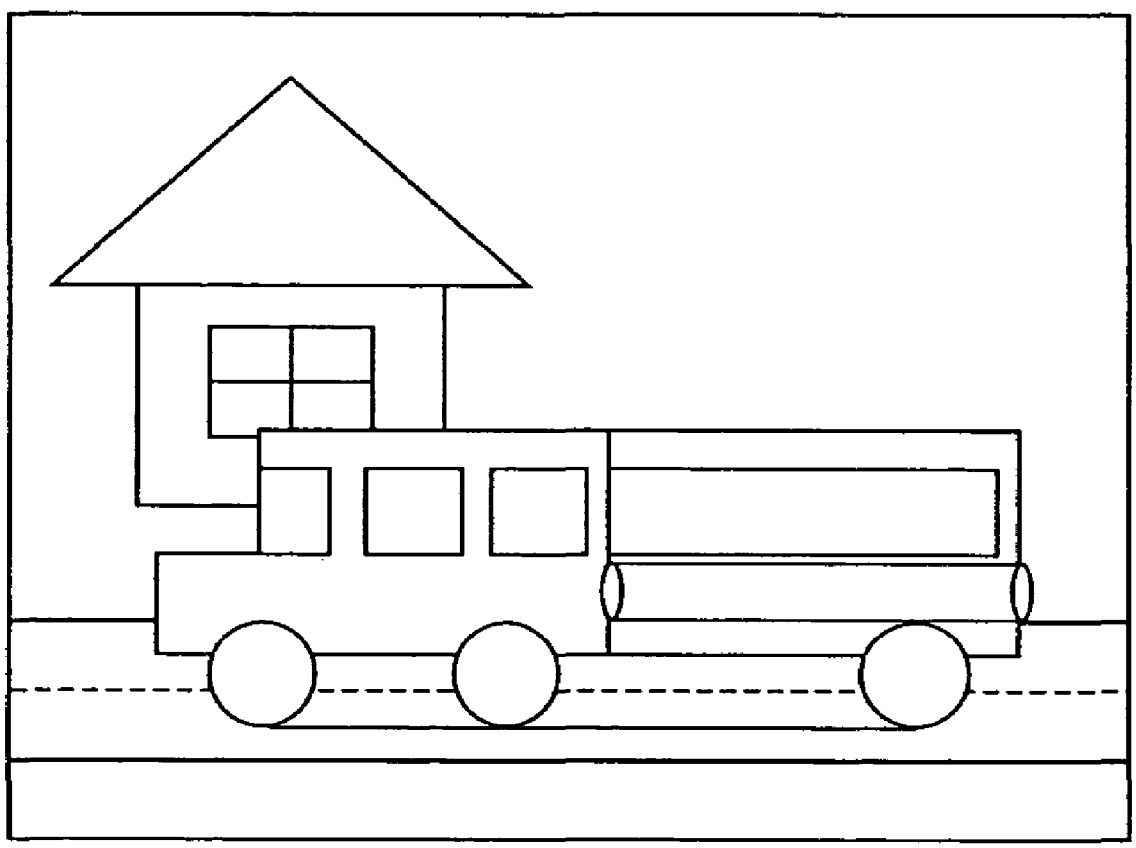
FIG. 12 is a final composite image according the second embodiment of the present invention.

First, feature points within the object selection frame 145b in the frame 141b used upon generation of the composite image from the images 144b and 144c are extracted. Within the object selection frame 145b, a window edge 150b and a tail lamp 151b of the vehicle 143b and another feature point (not shown), having generally high luminance, color hue, chromaticity and brightness, are extracted as feature points by edge detection and stored. Then the main object, the vehicle 143b is extracted based on the luminance, color hue, chromaticity and brightness levels obtained by the edge detection. Then, points having the same feature levels as those of previously stored points are extracted from the whole screen of the frame 141c (150c and 151c). The edge loci are obtained by connecting the edges between the respective frames with straight lines, and the amount and the direction of movement of the vehicle 143b are predicted. The locus between the edges 150b and 150c is indicated as an arrow 153; and that between the edges 151b and 151c is indicated as an arrow 154. Then image interpolation is performed along the loci with the same luminance, color hue, chromaticity and brightness, thereby performing image drawing such that the vehicle 143b flows to the vehicle 143c as shown in FIG. 12.

The composite image data made by the image composition unit 116 is inputted via the image selector 112 to the display unit 117 and the recording unit 118. The display unit 117 displays the image data on the display device such as a liquid crystal display. The recording unit 118 compresses the image data and stores the data onto a recording medium such as a memory card.

Next, the image sensing processing in the digital camera according to the present embodiment will be described with reference to FIG. 7.

The flowchart showing the image sensing processing in the digital camera according to the present embodiment is the same as that shown in FIG. 7, but the difference is that object(s) outside the object selection frame (for example, the frame 145b in FIGS. 9A and 9B) selected by the object selector 121 (in the first embodiment, within the object selection frame) in the respective images is brought into correspondence, and object(s) within the object selection frame (in the first embodiment, without the object selection frame) is interpolated such that the object(s) flows. The image composition to bring objects into correspondence and the interpolation to obtain an image where an object flows are the same as those described in the first embodiment.

At step S1001, when the first release switch (SW1) is turned ON, the process proceeds to step S1002.

At step S1002, image sensing is performed by the image sensing unit 17. The image sensing controller 18 drives the AF driving motor 14a to move the photographing lens 11 in the optical axis direction while detecting an image contrast based on an output from the image processor 111.

When a highest contrast is obtained, the driving of the photographing lens 11 is stopped, thereby the image sensing optical system is set to a focusing state (AF by hill climbing method). Note that the focusing adjustment may be performed by phase difference detection.

Further, at this time, the image sensing controller 18 obtains the brightness of an object based on the output from the image sensing unit 17.

At step S1003, it is determined whether or not the photographer sets the anti-shake effect operation unit 120 to the "lasting" setting. When the anti-shake effect operation unit 120 is set to the "lasting" setting, the process proceeds to step S1004, and otherwise, the process proceeds to step S1018.

Next, the flow of the case where the anti-shake effect operation unit 120 is set to the "lasting" setting will be described.

At step S1004, the number of times of image sensing and exposure periods of the respective times of image sensing are obtained based on the image sensing conditions such as the brightness of the object obtained at step S1002.

The image sensing conditions include:
1. brightness of object;
2. focal length of image sensing optical system;
3. brightness of image sensing optical system (aperture value); and
4. sensitivity of image sensing device.

For example, assuming that the sensitivity of the image sensing unit 17 is ISO 100, to measure the brightness of an object (photometry) and perform appropriate exposure based on the result of photometry, the aperture 13a is full-opened (e.g., f2.8) and the closing timing of the shutter 12a, i.e., the exposure period, is set to $1/50$ sec.

When the focal length of the image sensing optical system is equivalent to 100 mm of 35 mm film, image sensing with an exposure period of $1/50$ sec may cause image blurring due to camera shake. To prevent camera shake, the exposure period is set to $1/100$ sec and image sensing is performed twice.

On the other hand, when the focal length of the image sensing optical system is 400 mm, the exposure period is set to $1/500$ sec and image sensing is performed 10 times so as to prevent camera shaking.

In this manner, the exposure period upon plural times of image sensing is determined in correspondence with image sensing conditions, and the number of times of image sensing is set in correspondence with the image sensing conditions.

In a case where the same object is image-sensed plural times, it is preferable that exposure conditions of respective times of image sensing are close to an appropriate exposure as much as possible so as to perform image sensing with accurate information by the image sensing unit 17.

For this purpose, when an object is dark or the aperture of the photographing lens is narrowed and the brightness of the lens is low, or when the sensitivity of the image sensing unit 17 is low, the exposure periods of respective times of image sensing are lengthened as much as possible even in plural times of image sensing, to obtain effective exposure conditions.

Note that if exposure periods are too long, the influence of camera shaking appears in an image surface. Accordingly, as described above, when the focal length of the image sensing optical system is equivalent to 100 mm of 35 mm film, the exposure period is set to $1/100$ sec corresponding to about $1/100$ mm (focal length).

Further, the number of times of image sensing is controlled so as to compensate for the underexposure.

When the focal length is lengthened, the exposure period is further shortened so as to prevent image degradation due to camera shaking, and the number of times of image sensing is increased to compensate for the underexposure.

In this manner, in plural times of image sensing, as the object becomes darker or the aperture of the photographing lens is narrowed, the exposure period is lengthened. As the sensitivity of the image sensing unit 17 is decreased, the exposure period is lengthened. Further, as the focal length of the lens is lengthened, the exposure period is shortened.

The number of times of image sensing of serial image sensing is increased as the object becomes darker or aperture of the photographing lens is narrowed. As the sensitivity of the image sensing device is lowered, the number of times of image sensing is increased, and further, as the focal length of the lens is lengthened, the number of times of image sensing is increased.

After the completion of the above calculation, the setting of anti-shake mode (plural image sensing mode) is displayed on a display provided in a finder of the digital camera or a liquid crystal display as an extension unit of the digital camera, and at the same time, the number of times of image sensing is displayed on the display unit 117 for the photographer.

At step S1005, it is determined whether or not the shutter button 12c has been full-depressed. When the shutter button 12c has been full-depressed, the second release switch (SW2) is turned ON. In this case, the process proceeds to step S1006.

At step S1006, the obtained images are temporarily stored into the memory 113.

Step S1006 is repeated until it is determined at step S1007 that all the image sensing has been completed.

When all the image sensing has been completed, the process proceeds to step S1008.

At step S1008, the shift detector 114 extracts a characteristic image (feature point) from an image (e.g., the house 144b in FIGS. 9A and 9B) outside the object selection frame (e.g., the frame 145 in FIGS. 9A and 9B) previously set by the object selector 121, and obtains the coordinates of the image.

At step S1009, the coordinate converter 115 performs coordinate conversion of respective images. Note that coordinate conversion is not performed only on the first frame image (first image). That is, the first image is used as a reference image upon coordinate conversion.

The feature point extraction at step S1008 and the coordinate conversion at step S1009 are performed on all the second and subsequent images, and when it is determined at step S1010 that the coordinate conversion of all the images has been completed, the process proceeds to step S1011.

At step S1011, the shift detector 114 extracts a characteristic image (feature point) from an image (e.g., the vehicle 143b in FIG. 11) in the object selection frame (e.g., the frame 145 in FIG. 11) previously set by the object selector 121 in the first-obtained image (first image (the frame 141b in FIG. 11)), and obtains the coordinates of the image. At this time, the luminance, color hue, chromaticity and brightness of the extracted point are stored. Points having the same features are extracted as a group, thereby extracting the image of the vehicle 143b. The shift detector 114 extracts points having the same features as those of the stored points from the second image group (the second image) (the frame 141c in FIG. 11), and obtains the loci of the image of the vehicle 143b.

Figure 11:
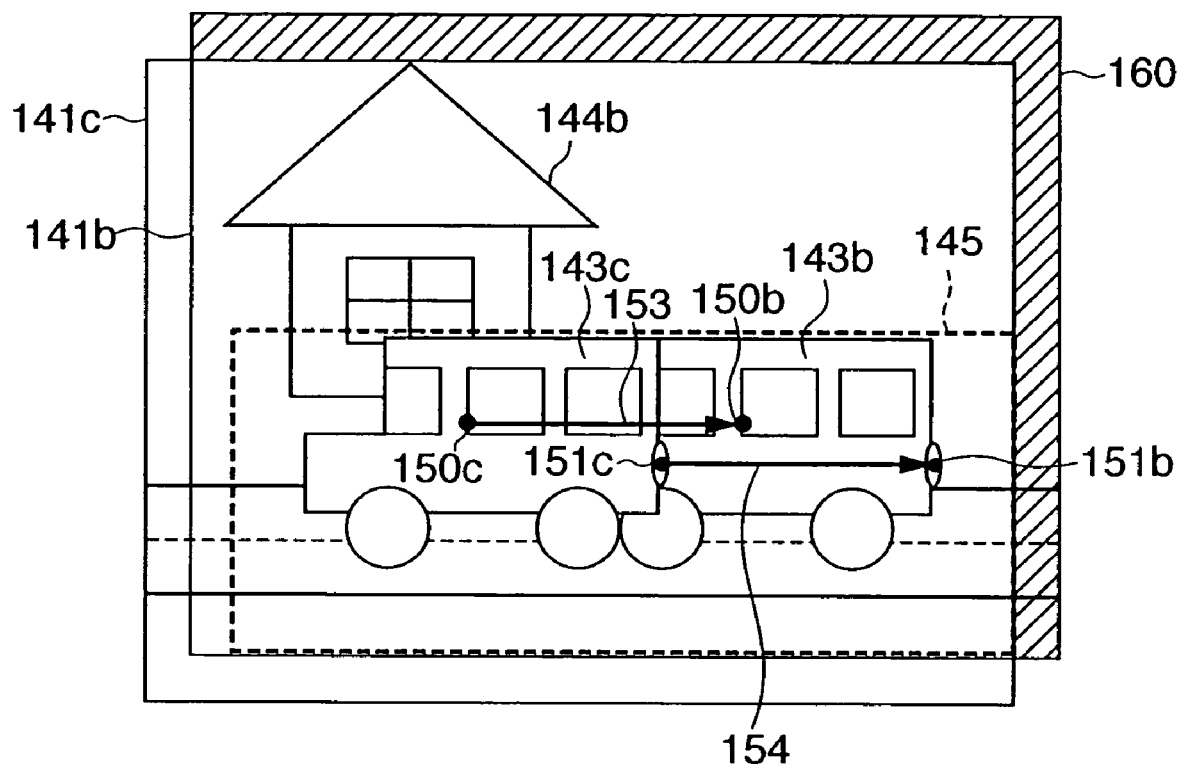
FIG. 11 is an explanatory view of the image interpolation on an object other than the main object according to the second embodiment of the present invention.

At step S1012, image interpolation is performed using the luminance, color hue, chromaticity and brightness of the respective points along the loci calculated at step S1011, thereby generating an image where the vehicle 143b flows to the tree 143c in FIG. 11.

The feature point extraction at step S1011 and the image interpolation at step S1012 are repeated until all the second and subsequent images have been processed. When it is determined at step S1013 that the coordinate conversion of all the images has been completed, the process proceeds to step S1014.

At step S1014, the composition of the first image and the respective images of the coordinate-converted second image group is performed.

The image composition is performed by averaging corresponding coordinate values of the respective images, and random noise in the image can be reduced by the averaging. Then, the image with reduced noise is subjected to gain control to increase the level of gain, to optimize the exposure.

At step S1015, in the composite image, an area where the respective images are not overlaid due to composition shift (an area 160 in FIG. 11) is cut, and the image is subjected to diffusion-interpolation to obtain the initial frame size.

At step S1016, the image data generated by the image processor 111 or the composite image data made by the image composition unit 116 is displayed on the display unit 117.

At step S1017, the image data generated by the image processor 111 or the composite image data made by the image composition unit 116 is stored on a recording medium such as a memory card.

At step S1018, the process returns to START.

Note that in a case where the shutter button 12c is still half-depressed and the switch SW1 is ON at step S1018, the process proceeds to steps S1001 to S1004 again.

Further, in a case where the shutter button 12c has been full-depressed and the switch SW2 is ON at step S1018, the process does not return to START but stands by at step S1017.

Next, the flow of the case where the anti-shake effect operation unit 120 is OFF at step S1003 will be described.

At step S1003, if it is determined that the anti-shake effect operation unit 120 is OFF, the process proceeds to step S1020.

At step S1020, it is determined whether or not the shutter button 12c has been full-depressed. When the shutter button 12c has been full-depressed, the second release switch (SW2) is turned ON. In this case, the process proceeds to step S1021.

At step S1021, the process stands by until normal image sensing (normal image sensing mode under exposure conditions effective in one exposure) has been completed. Upon completion of exposure, the process proceeds to step S1016.

At step S1016, the image data generated by the image processor 111 or the composite image data made by the image composition unit 116 is displayed on the display unit 117.

At step S1017, the image data generated by the image processor 111 or the composite image data made by the image composition unit 116 is stored on a recording medium such as a memory card.

At step S1018, the process returns to START.

According to the second embodiment, an image with lasting effects and an image without blur due to camera shaking can be obtained by performing image sensing plural times for exposure periods not to cause camera shaking, then performing image composition so as to eliminate shifts of object(s) other than a main object while to correct the locus of motion of the main object in images obtained by the plural times of image sensing.

The present invention is not limited to the above embodiments and various changes and modifications can be made within the spirit and scope of the present invention. Therefore, to appraise the public of the scope of the present invention, the following claims are made.

CLAIM OF PRIORITY

This application claims priority from Japanese Patent Application No. 2004-271009 filed on Sep. 17, 2004, the entire contents of which are incorporated by reference herein.

What is claimed is:

1. An image sensing apparatus, comprising:
a selector usable to select a main object;
an image sensing unit that senses a plurality of images including the main object;
a memory unit that stores the plurality of images;
an image combining unit that combines the plurality of images stored in the memory unit in order to generate a combined image in which the main object appears to be stopped and an object other than the main object appears to be flowing, the image combining unit performing an image interpolation between the plurality of images stored in the memory unit so as to make the object other than the main object in the combined image appear to be flowing; and a recording unit that records image data corresponding to the combined image on a recording medium.

2. The image sensing apparatus according to claim 1, wherein the image sensing apparatus is one of a digital camera, a digital video camera, a cellular phone having a camera, and a computer having a camera.

3. An image sensing apparatus, comprising:

a selector usable to select a main object;

an image sensing unit that senses a plurality of images including the main object;

a memory unit that stores the plurality of images;

an image combining unit that combines the plurality of images stored in the memory unit in order to generate a combined image in which the main object appears to be flowing and an object other than the main object appears to be stopped, the image combining unit performing an image interpolation between the plurality of images stored in the memory unit so as to make the main object in the combined image appear to be flowing; and a recording unit that records image data corresponding to the combined image on a recording medium.

4. The image sensing apparatus according to claim 3, wherein the image sensing apparatus is one of a digital camera, a digital video camera, a cellular phone having a camera, and a computer having a camera.

5. The image sensing apparatus according to claim 1, wherein the recording unit compresses the image data before the recording unit records the image data on the recording medium.

6. The image sensing apparatus according to claim 3, wherein the recording unit compresses the image data before the recording unit records the image data on the recording medium.

* * * * *